United States Patent
Spare et al.

(10) Patent No.: US 7,855,025 B2
(45) Date of Patent: Dec. 21, 2010

(54) ANODE LOOP PRESSURE CONTROL IN PEM FUEL CELL SYSTEM

(75) Inventors: Bradley Spare, Oceanside, CA (US); Keith Oglesby, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 1312 days.

(21) Appl. No.: 11/285,543

(22) Filed: Nov. 21, 2005

(65) Prior Publication Data
US 2007/0116992 A1 May 24, 2007

(51) Int. Cl.
*H01M 8/04* (2006.01)
(52) U.S. Cl. ........................ 429/446; 429/443
(58) Field of Classification Search ............. None
See application file for complete search history.

(56) References Cited

U.S. PATENT DOCUMENTS

| | | | |
|---|---|---|---|
| 6,646,413 B2 | 11/2003 | Autenrieth et al. | |
| 2003/0008185 A1 | 1/2003 | Sugino et al. | |
| 2003/0022043 A1 | 1/2003 | McElroy | |
| 2003/0157383 A1 | 8/2003 | Takahashi | |
| 2004/0013920 A1 | 1/2004 | Hasuka et al. | |
| 2004/0018404 A1* | 1/2004 | Kojima et al. | 429/22 |
| 2004/0038098 A1* | 2/2004 | Imamura et al. | 429/25 |
| 2004/0224191 A1* | 11/2004 | Skiba | 429/13 |

* cited by examiner

*Primary Examiner*—John S Maples
(74) *Attorney, Agent, or Firm*—David Kelley, Esq.; Tung & Associates

(57) ABSTRACT

A method of operating a fuel cell stack is disclosed. The method includes operating the fuel cell stack in accordance with a predetermined profile of fuel gas/oxidant gas delta pressure vs. time, monitoring a fuel gas/oxidant gas delta pressure vs. time value of the fuel cell stack and adjusting pressure of the fuel gas by consuming excess quantities of the fuel gas in the fuel cell stack when the fuel gas/oxidant gas delta pressure vs. time value of the fuel cell stack exceeds the predetermined profile.

8 Claims, 1 Drawing Sheet

ANODE LOOP PRESSURE CONTROL IN PEM FUEL CELL SYSTEM

FIELD OF THE INVENTION

The present invention relates to fuel cells suitable for generating electricity for automotive or other applications. More particularly, the present invention relates to an anode loop pressure control method in which excess hydrogen pressure in an anode loop of a fuel cell system is mitigated by consuming excess quantities of fuel gas in the system, such as by: (1) increasing the current demand on the fuel cell; (2) periodically shutting off the fuel supply; and (3) raising the operating pressure of the fuel cell system. These methods can be implemented independently or in any combination.

BACKGROUND OF THE INVENTION

In recent years, much research has been devoted to the development of fuel cell systems to generate energy for automotive and other applications. A fuel cell system produces electricity by harvesting electrons from hydrogen gas. Oxygen is reduced by the harvested electrons and combined with hydrogen protons to produce water as a by-product. Fuel cell vehicles are highly efficient and environmentally-friendly.

A typical conventional PEM (polymer electrolyte membrane) fuel cell system includes multiple fuel cells, each of which includes a polymer electrolyte membrane interposed between an anode catalyst layer and a cathode catalyst layer to form a membrane electrode assembly (MEA). A gas diffusion medium (GDM) layer engages each catalyst layer, and a bipolar plate engages each GDM layer. The anode side bipolar plate is provided with flowfield channels which distribute a reactant gas, which contains hydrogen rich gas or may be pure hydrogen gas, to the anode catalyst layer through the anode side GDM layer. The cathode side bipolar plate is likewise provided with flowfield channels which distribute an oxidant gas, which may be air and contains oxygen or may be pure oxygen, to and reactant water vapor away from the cathode catalyst layer through the cathode side GDM layer.

During operation of the fuel cell system, hydrogen gas is split into electrons and protons at the anode catalyst layer. The protons are passed from the anode catalyst layer, through the electrolyte membrane and to the cathode catalyst layer. The electrons are distributed as electrical current from the anode catalyst layer, through an external circuit to drive an electric load, and then to the cathode catalyst layer. At the cathode catalyst layer, molecular oxygen is split into oxygen atoms, which combine with the electrons and hydrogen protons to form water. The water is distributed from the fuel cell system through the flowfield plates of the cathode side bipolar plate. In the fuel cell system, multiple individual fuel cells are typically stacked in series to form a fuel cell stack in which voltages and quantities of electricity proportional to the number of fuel cells are generated.

In a typical PEM fuel cell system, fuel cell stack modules are constrained by a specification or predetermined fuel gas/oxidant gas delta pressure vs. time profile which maintains a certain hydrogen/air delta pressure vs. time value, defined as changes in the hydrogen pressure relative to the air pressure at the fuel cell stack inlet over time. Normally, a pressure control device in the fuel cell system monitors the hydrogen and air pressures at the stack inlet and supplies hydrogen and air to the stack in the proper hydrogen/air pressure gradient in such a manner that the hydrogen/air delta pressure vs. time value is constrained within the specification. However, as the pressure control device ages over time, the pressure regulation capability of the pressure control device typically degrades, and consequently, its ability to control hydrogen pressure in the anode loop of the stack, particularly at idle flowrates, decreases. If the hydrogen/air delta pressure vs. time value drifts beyond the specification, particularly by the introduction of excess quantities of hydrogen into the stack via the defective or degrading pressure control device, then the excess hydrogen may migrate from the anode side into the cathode side of the stack. A common solution to this problem is to purge the excess hydrogen from the anode side of the fuel cell stack to the atmosphere. However, this method adversely affects fuel economy and hydrogen emissions.

Accordingly, an anode loop pressure control method is needed in which excess hydrogen in an anode loop of a fuel cell stack in a fuel cell system is consumed (1) by increasing the current demand on the stack, (2) periodically shutting off the fuel supply to the stack and/or (3) raising the operating pressure of the system. This adaptation of the system operating characteristics eliminates excessive quantities of hydrogen from the anode loop of the stack, thus mitigating fuel cell degradation while conserving fuel economy and hydrogen emissions.

SUMMARY OF THE INVENTION

The present invention is generally directed to a novel anode loop pressure control method in which the system operating characteristics of a fuel cell system are adapted to (1) consume excess hydrogen in an anode loop of a fuel cell stack; (2) reduce the quantity of hydrogen delivered to the anode loop; and/or (3) raise the air pressure in the cathode loop. Consequently, excessive accumulation of hydrogen in the stack is prevented, or adjusted for, thus increasing the durability of the stack membrane and minimizing migration of hydrogen from the anode side to the cathode side of the stack. According to the method, when the fuel cell stack is operated typically at an idle state or low power level, a delta pressure vs. time value, which indicates the hydrogen pressure relative to the air pressure at the fuel cell stack inlet over time, is monitored. When excess hydrogen is present in the anode side of the fuel cell stack relative to the quantity of air in the cathode side of the stack, a pre-determined hydrogen/air delta pressure specification is exceeded and a hydrogen/air notification may be activated. If the hydrogen/air notification is activated once or a predetermined number of times, a signal is transmitted to a vehicle controller, causing the vehicle controller to (1) increase the output current demand on the fuel cell stack. Additionally or alternatively, the (2) supply of hydrogen to the fuel cell stack may be periodically shut off and/or (3) the operating pressure of the system increased. Furthermore, continued occurrences of the hydrogen/air notification are used to adjust or adapt the minimum current demand on the stack, the frequency and duration of the shutoff, and/or the air pressure on the cathode. Using this method, the vehicle controller is able to compensate for continued degradation of the pressure control device over time, typically due to aging of the pressure control device.

BRIEF DESCRIPTION OF THE DRAWINGS

The invention will now be described, by way of example, with reference to the accompanying drawing, in which.

DETAILED DESCRIPTION OF THE INVENTION

Figure 1:
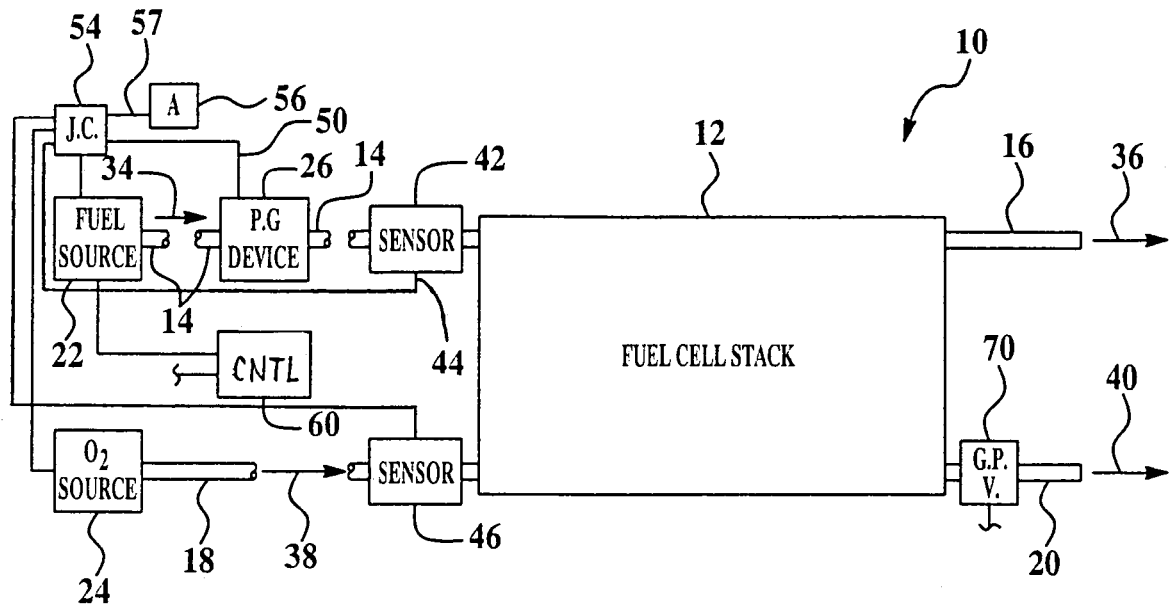
FIG. 1 is a schematic diagram of a fuel cell system in implementation of the method of the present invention.

A schematic view of a fuel cell system having an electronically controlled pressure control device 26 in implementation of the present invention is generally indicated by reference numeral 10 in FIG. 1. The fuel cell system 10 shown in FIG. 1 is one example of a system which is suitable for implementation of the present invention and may be used in a fuel cell vehicle (not shown) or in any other application in which electrical power is required. The fuel cell system 10 generally includes a fuel cell stack 12 having multiple, stacked fuel cells (not shown). A fuel source 22 is connected to the fuel cell stack 12 through a fuel inlet conduit 14, and an oxidant source 24 is connected to the fuel cell stack 12 through an oxidant inlet conduit 18. Accordingly, the fuel inlet conduit 14 is adapted to distribute a fuel gas, which hereinafter will be referred to as hydrogen 34, from the fuel source 22 to the anode loop of the fuel cell stack 12, whereas the oxidant inlet conduit 18 is adapted to distribute an oxidant gas, which hereinafter will be referred to as air 38 that contains oxygen, from the oxidant source 24 to the cathode loop of the fuel cell stack 12. A fuel exhaust outlet 16 extends from the fuel cell stack 12 for distributing fuel exhaust 36 from the fuel cell stack 12, and an oxidant exhaust outlet 20 extends from the fuel cell stack 12 for distributing oxidant exhaust and water 40 from the fuel cell stack 12. Each of the fuel source 22 and the oxidant source 24 typically includes a gas delivery subsystem (not shown) having a mechanical device such as a compressor, fan, pump, rotary piston blower or equivalent mechanical device that forces the fuel gas 34 through the fuel inlet conduit 14 and the oxidant gas 38 through the oxidant inlet conduit 18, respectively. In one configuration of the fuel cell system 10, the fuel exhaust outlet 16 is routed back to the fuel inlet conduit 14 in a closed loop. In an alternative configuration of the fuel cell system 10, the fuel cell stack 12 is dead-ended, in which case the fuel exhaust outlet 16 may be capped, for example.

A fuel gas sensor 42 is provided at the inlet of the fuel inlet conduit 14 with the fuel cell stack 12 to sense the pressure of the hydrogen 34 in the anode loop of the fuel cell stack 12. An oxidant gas sensor 46 is likewise provided at the inlet of the oxidant inlet conduit 18 with the fuel cell stack 12 to sense the pressure of the air 38 in the cathode loop of the fuel cell stack 12. Alternatively, the fuel gas sensor 42 and the oxidant gas sensor 46 may be provided in the fuel exhaust outlet 16 and oxidant exhaust outlet 20, respectively. A pressure control device 26 is provided in the fuel inlet conduit 14, and thus, is connected to the fuel gas sensor 42 and the fuel source 22 through the fuel inlet conduit 14. The pressure control device 26 is also connected to the fuel source 22 such as via fuel source electrical connection (not shown) and to the oxidant source 24 such as via oxidant source electrical connection (not shown). Accordingly, the pressure control device 26 is designed to control the fuel source 22 and oxidant source 24 in such a manner that the hydrogen 34 and air 38, respectively, are supplied to the fuel cell stack 12 in the proper ratios to maintain optimum operation of the fuel cell stack 12.

A signal controller 54 is connected to the fuel gas sensor 42, such as via controller electrical connection (not shown). The signal controller 54 is further connected to the oxidant gas sensor 46, such as via controller electrical connection (not shown). A hydrogen/air notification 56, the purpose of which will be hereinafter described, is connected to the signal controller 54 such as via notification electrical connection 57. The signal controller 54 is further connected to the pressure control device 26 through electrical connection 50 and to the fuel source 22 and the oxygen source 24, as shown. During operation of the fuel cell stack 12, the fuel gas sensor 42 transmits to the signal controller 54 signals which indicate the pressure of the hydrogen 34 in the anode side of the fuel cell stack 12, whereas the oxidant gas sensor 46 transmits to the signal controller 54 signals which indicate the pressure of the air 38 in the cathode side of the fuel cell stack 12. As will be hereinafter described, the signal controller 54 is programmed to constantly monitor the delta pressure vs. time value of the hydrogen 34 relative to the air 38. In the event that the delta pressure vs. time value exceeds a predetermined specification, indicating an excessive quantity of hydrogen 34 in the anode loop of the fuel cell stack 12, the signal controller 54 activates the hydrogen/air notification 56 to indicate the need to replace and/or service the pressure control device 26.

The signal controller 54 is connected to a vehicle controller 60 such as via vehicle controller electrical connection (not shown). The vehicle controller 60 is connected to electrical loads (not shown) on the fuel cell vehicle, which are, in turn, connected to the fuel cell stack 12. The vehicle controller 60 controls the current demand of the fuel cell vehicle, for example, or other application which is supplied with electrical power by the fuel cell stack 12, typically in conventional fashion. The vehicle controller 60 is typically further connected to the fuel source 22 and may be capable of periodically shutting off the supply of hydrogen 34 to the fuel cell 12. The signal controller 54 may further be connected to a back pressure valve 70 which is provided in the oxidant exhaust conduit 20 to regulate the oxidant pressure inside the fuel cell stack 12. Additionally or alternatively, the signal controller 54 may regulate the oxidant pressure inside the fuel cell stack 12 through the oxidant source 24.

According to the method of the present invention, in the event that the monitored delta pressure vs. time value of the hydrogen 34 relative to the air 38 exceeds the specification once or a predetermined number of times, the signal controller 54 transmits an activation signal to the vehicle controller 60. In turn, the vehicle controller 60 may (1) increase the demand for electrical current from the fuel cell stack 12, thus consuming the excess hydrogen 34 in the anode side of the fuel cell stack 12, as will be hereinafter further described. In addition or alternatively, the signal controller 54 may (2) periodically cause the fuel source 22 to shut off the supply of hydrogen 34 to the fuel cell stack 12 and/or (3) raise the operating pressure of the fuel cell system 10 by increasing the air pressure at the cathode side of the fuel cell stack 12.

The present invention is suitable for the pressure control device 26 which was heretofore described and illustrated with respect to FIG. 1 and is known as an electrically controlled pressure control device. However, the invention is equally adaptable to a mechanical pressure control device which is known to those skilled in the art, the inlet side of which is connected to the fuel source 22 through the fuel inlet conduit 14 and the outlet side of which is mechanically or confluently connected to the fuel inlet conduit and oxidant inlet conduit through separate sense lines or small tubes (not shown).

Under normal operation of the fuel cell system 10, the fuel cell controller 60 operates the gas delivery sub-systems to provide the appropriate reactants to the fuel cell stack 12 to meet a demanded electrical power output for operation of the fuel cell vehicle or other application responsive to input from a vehicle driver or other operator of the fuel cell system 10. Therefore, the pressure control device 26 causes the fuel source 22 to distribute hydrogen 34 through the fuel inlet conduit 14 and into the anode loop of the fuel cell stack 12 and the oxidant source 24 to distribute air 38 through the oxidant inlet conduit 18 and into the cathode loop of the fuel cell stack 12.

In the fuel cell stack 12, the individual fuel cells generate electrical power by harvesting electrons from the hydrogen 34; passing the electrons as electrical current to an external circuit, which powers an electric motor (not shown); splitting molecular oxygen in the air 38 into oxygen atoms; and combining protons from the oxidized hydrogen with the electrons and oxygen atoms to form water. Excess hydrogen 34 is discharged as fuel exhaust 36 from the fuel cell stack 12 through the fuel exhaust outlet 16. Exhaust air and water vapor is discharged as oxidant exhaust 40 from the fuel cell stack 12 through the oxidant exhaust outlet 20.

Normally, as the hydrogen 34 and air 38 are delivered to the fuel cell stack 12, the pressure control device 26 constantly monitors the hydrogen pressure in the anode loop of the fuel cell stack 12 via input from the fuel gas sensor 42 and the air pressure in the cathode loop of the fuel cell stack 12 via input from the oxidant gas sensor 46. Responsive to this input, the pressure control device 26 controls the pressure of hydrogen 34 and oxygen 38 flowing into the fuel cell stack 12 to ensure that the hydrogen/air delta pressure vs. time value stays within the specification. Over time, however, the pressure control device 26 gradually loses the capability to properly control the pressure of hydrogen 34 relative to the pressure of air 38 which enters the fuel cell stack 12. This may cause the actual hydrogen/air delta pressure value over time value to stray beyond the specification, resulting in flow of excessive quantities of hydrogen into the anode loop of the fuel cell stack 12. Therefore, the hydrogen 34 may migrate from the anode loop to the cathode loop of the fuel cell stack 12.

Throughout operation of the fuel cell system 10, the signal controller 54 receives input from the fuel gas sensor 42 and the oxidant gas sensor 46 regarding the pressure of hydrogen 34 and air 38 at the respective inlets of the fuel cell stack 12. Using this input, the signal controller 54 constantly monitors the hydrogen/air delta pressure vs. time value to determine whether it falls within the specification. In the event that the monitored hydrogen/air delta pressure vs. time value exceeds the specification, the signal controller 54 typically activates the hydrogen/air notification 56, thus signaling the need to service the pressure control device 26. If the monitored hydrogen/air delta pressure vs. time value exceeds the specification once or a predetermined number of times (the number of which was previously programmed into the signal controller 54), the signal controller 54 transmits a signal to the fuel cell controller 60. In response, the fuel cell controller 60 may (1) increase the current demand from the fuel cell stack 12 by increasing the electrical load. As a result, in order to supply the increased electrical load, the fuel cell stack 12 consumes the excess hydrogen in the anode loop of the fuel cell stack 12 to generate the increased current. Additionally or alternatively, the fuel cell controller 60 may (2) periodically shut off flow of hydrogen 34 from the fuel source 22 to the fuel cell stack 12. Additionally or alternatively, the signal controller 54 may raise the operating pressure of the fuel cell system 10 through the back pressure valve 70 and/or oxidant source 24. Consequently, the pressure of the hydrogen in the anode loop of the fuel cell stack 12 decreases, thereby preventing migration of excess hydrogen from the anode loop to the cathode loop of the fuel cell stack 12. Furthermore, the pressure control device 26 can remain in service until replacement without significantly compromising the structural or functional integrity of the fuel cell stack 12.

Figure 2:
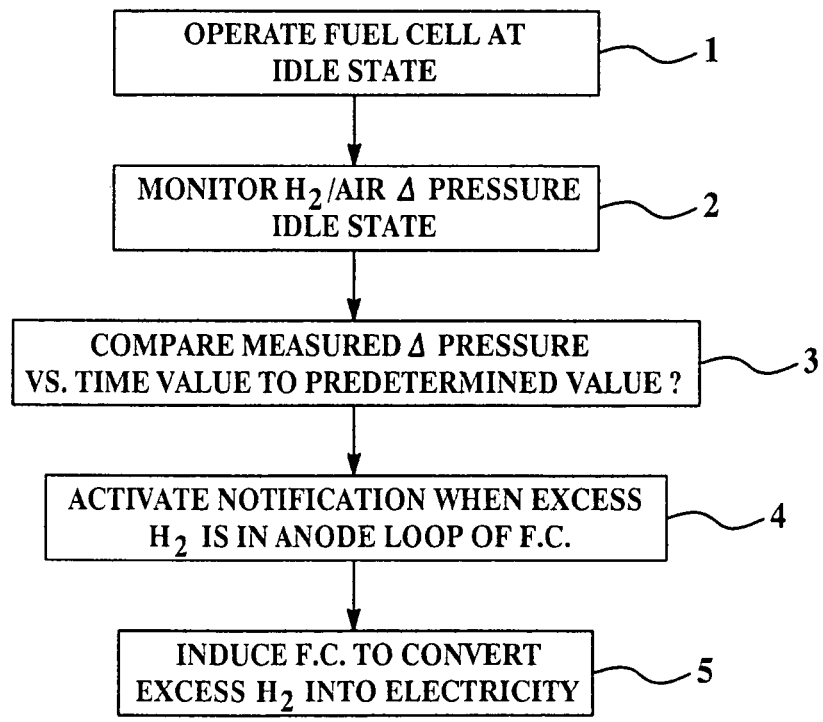
FIG. 2 is a flow diagram illustrating steps carried out according to an anode loop pressure control method of the present invention.

The steps carried out according to the method of the present invention are summarized in the flow diagram of FIG. 2. In step 1, a fuel cell stack is operated at an idle state (such as about <10 amps current output, for example). In step 2, the hydrogen/air delta pressure vs. time value of the fuel cell stack is constantly monitored. In step 3, the monitored hydrogen/air delta pressure vs. time value is simultaneously compared with a predetermined specification for the hydrogen/air delta pressure vs. time value. In step 4, a notification is typically activated when the monitored hydrogen/air delta pressure vs. time value exceeds the specification, thus indicating the presence of excessive quantities of hydrogen in the anode loop of the fuel cell and signaling the need to replace or repair the pressure control device 26. In step 5, the fuel cell may be induced to convert excess hydrogen into electrical current by increasing the current demand on the fuel cell stack. Additionally or alternatively, supply of hydrogen to the fuel cell stack may be periodically shut off. Additionally or alternatively, the operating pressure of the system may be increased. Consequently, the pressure of the hydrogen in the anode loop of the fuel cell stack decreases.

It is to be understood that the invention is not limited to the exact construction and method which has been previously delineated, but that various changes and modifications may be made without departing from the spirit and scope of the invention as delineated in the following claims.

What is claimed is:

1. A method of operating a fuel cell stack, comprising:
   operating said fuel cell stack in accordance with a predetermined profile of fuel gas pressure relative to oxidant pressure vs. time, said fuel gas pressure measured in an supply inlet or in an exhaust outlet of said fuel cell stack, wherein a value of said fuel gas pressure relative to oxidant pressure vs. time exceeding said predetermined profile indicates excess quantities of hydrogen in said fuel cell stack;
   monitoring said fuel gas pressure relative to oxidant pressure vs. time value of said fuel cell stack; and
   adjusting said pressure of said fuel gas by consuming said excess quantities of said fuel gas in said fuel cell stack when said fuel gas pressure relative to oxidant pressure vs. time value of said fuel cell stack exceeds said predetermined profile.

2. The method of claim 1 wherein said consuming excess quantities of said fuel gas in said fuel cell stack comprises inducing said fuel cell stack to convert said excess quantities of said fuel gas into electrical current.

3. The method of claim 1 wherein said fuel gas comprises hydrogen.

4. The method of claim 1 wherein said oxidant gas comprises air containing oxygen.

5. The method of claim 1 wherein said consuming excess quantities of said fuel gas in said fuel cell stack comprises raising an operating pressure of said fuel cell stack when said fuel gas/oxidant gas delta pressure vs. time value exceeds said predetermined profile.

6. The method of claim 1 wherein said operating said fuel cell stack comprises operating said fuel cell stack with an output current of less than about 10 amps.

7. The method of claim 5 wherein said operating said fuel cell stack in an idle state comprises operating said fuel cell stack with an output current of about <10 amps.

8. The method of claim 1 further comprising providing a notification and activating said notification when said fuel gas pressure relative to oxidant pressure vs. time value exceeds said predetermined profile.

* * * * *